Sept. 13, 1927.
C. H. R. COLLINS
1,642,013
APPARATUS FOR THE MANUFACTURE OF RUBBER SOLED FOOTWEAR
Filed Nov. 4, 1926    3 Sheets-Sheet 1
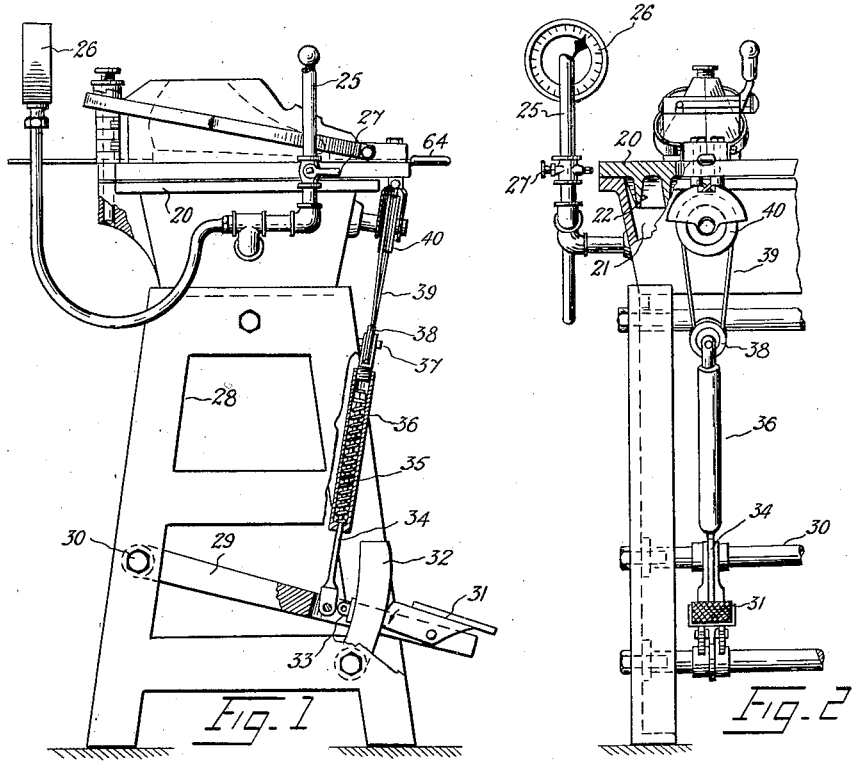
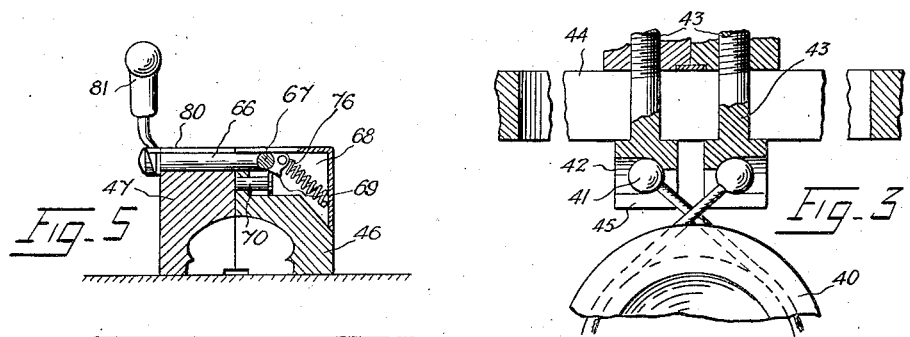
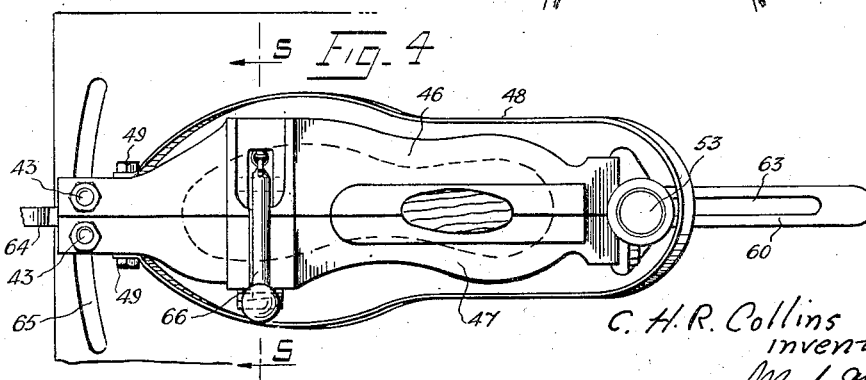

Sept. 13, 1927.  C. H. R. COLLINS  1,642,013
APPARATUS FOR THE MANUFACTURE OF RUBBER SOLED FOOTWEAR
Filed Nov. 4, 1926        3 Sheets-Sheet 2
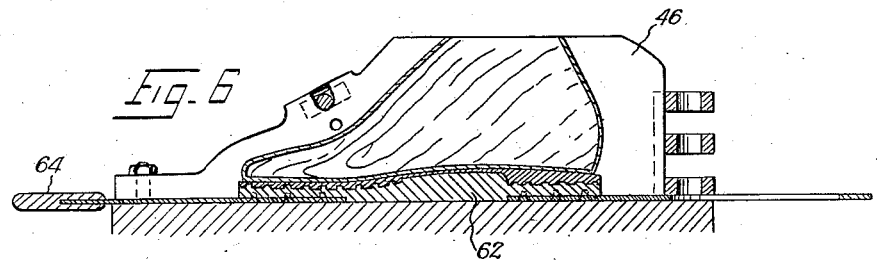
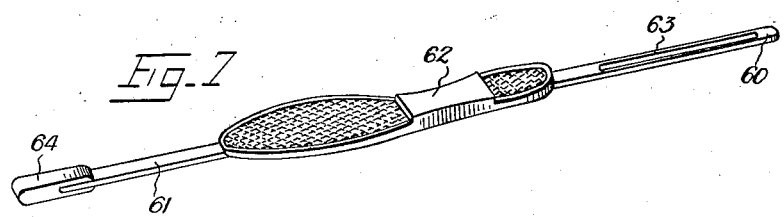
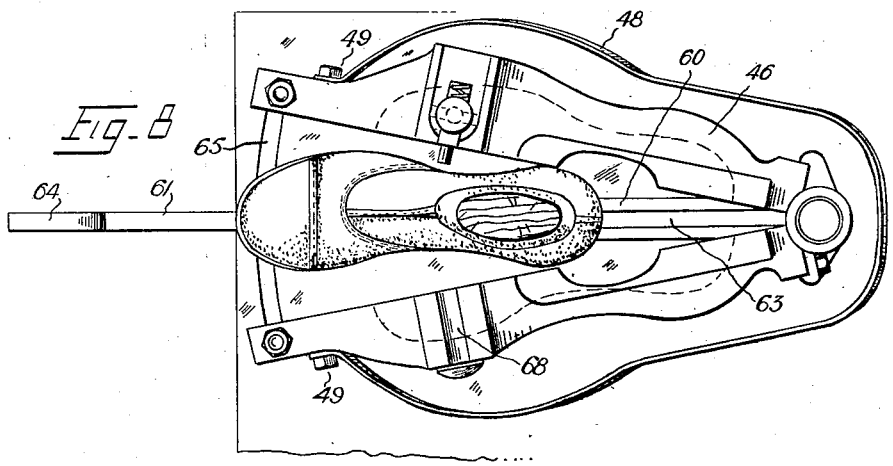

Sept. 13, 1927.  
C. H. R. COLLINS  
1,642,013  
APPARATUS FOR THE MANUFACTURE OF RUBBER SOLED FOOTWEAR  
Filed Nov. 4, 1926    3 Sheets-Sheet 3
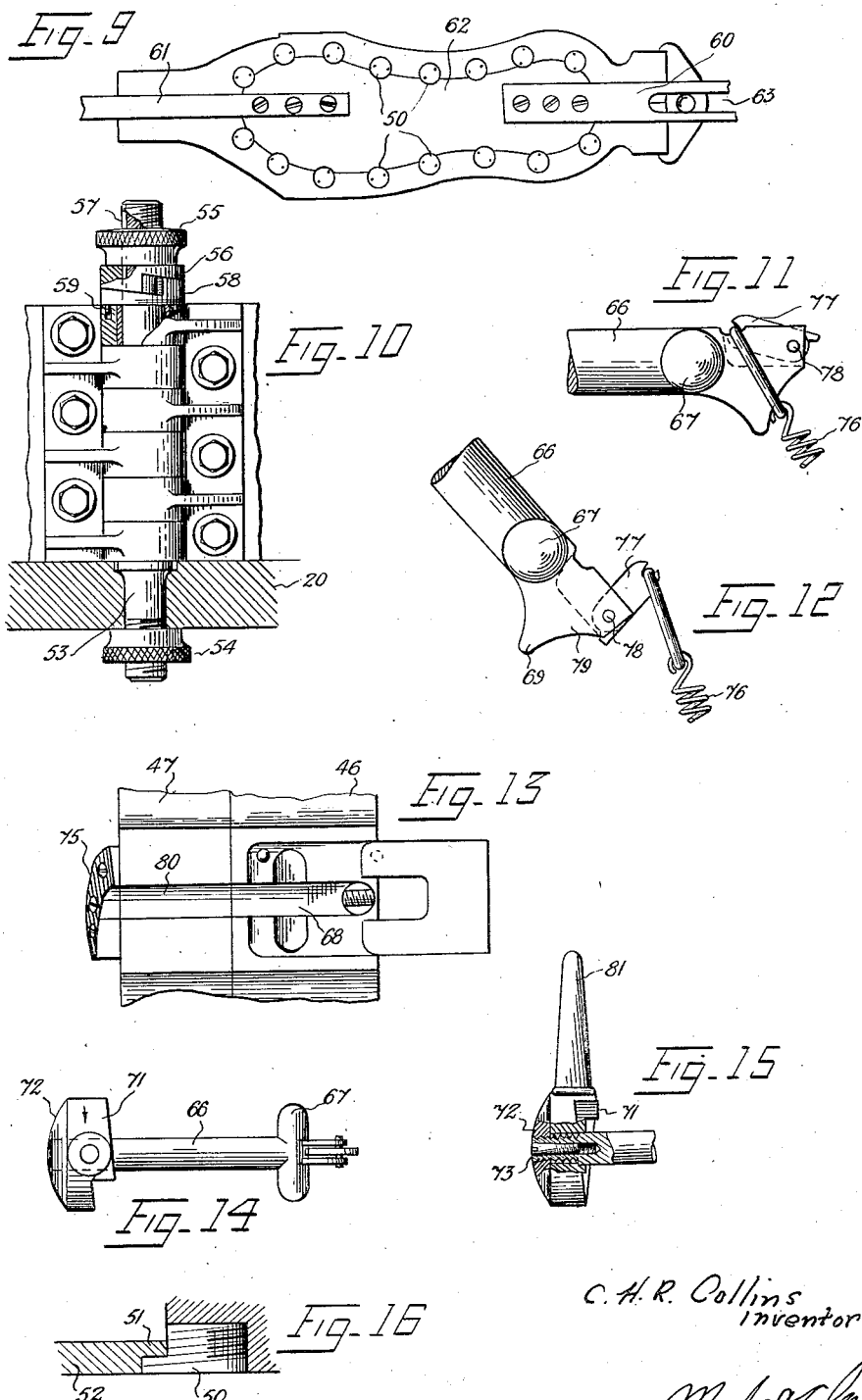

Patented Sept. 13, 1927.

1,642,013

UNITED STATES PATENT OFFICE.

CHARLES HORACE RUSSELL COLLINS, OF MARRICKVILLE, NEAR SYDNEY, NEW SOUTH WALES, AUSTRALIA.

APPARATUS FOR THE MANUFACTURE OF RUBBER-SOLED FOOTWEAR.

Application filed November 4, 1926, Serial No. 146,252, and in Australia November 23, 1925.

According to a known process shoes or boots having fabric vamps or bodies and rubber soles are produced by closing the skirt of the vamp or body over a last upon an insole of rubber impregnated fabric the skirt being tucked and crimped down to set flat and hammered down. The rubber impregnation functions as an agglutinant to hold the infolded skirt of the upper to the insole and the securement is obtained without relying upon tacks or stitching. A rubber sole piece with a built up heel is then set on the sole portion of the upper, the surfaces being first wetted up with rubber solution or solvent to promote adhesion and a foxing strip is set around the welt portion. The complete structure is then set in a mould and distended by means of a pneumatic inflation which is placed within it. The inflation operates to maintain effective pressure so as to distend the upper to fill the mould and to compact the sole structure and the foxing, and heat being applied to the mould the rubberized structure is "cooked" to soft vulcanize it. In due time the mould is opened and the finished boot or shoe removed from it.

In the operation of the apparatus used for conducting that process, it has been realized that in order to produce boots or shoes according to the process with added efficiency and economy greater facility should be offered for the insertion and removal of the goods and also that the mould should be held in perfect contact with the top face of the hot table whilst the inflation is distended; and the present invention consists in an improved construction and arrangement of mould for the carrying out of the said method of manufacture.

In the accompanying drawings:—

Fig. 1 is a side elevational view, partly in section, showing a mould according to the present invention set on a vulcanizing table with pedal operated means for controlling the opening and closing of the mould;

Fig. 2 is a frontal elevational view corresponding with Fig. 1;

Fig. 3 is a fragmentary detail view on enlarged scale showing the bridle end fastenings through which the pedal gear is connected to the mould;

Fig. 4 is a top plan view;

Fig. 5 is a transverse section on the vertical plane 5—5 Fig. 4;

Fig. 6 is a longitudinal section through the division in the mould showing a boot or shoe in the mould in process of cooking;

Fig. 7 is a perspective view showing a "peel" on which the sole plate of the mould is carried;

Fig. 8 is a top plan corresponding with Fig. 4 but showing the mould open and the shoe which has been cooked drawn out on the peel ready for removal;

Fig. 9 is a bottom plan of the mould showing the peel attachments to the sole plate;

Fig. 10 is a sectional elevational view of the back hinge on which the two sections of the mould are mounted on a post which is fixed in the hot plate of the cooking table;

Figs. 11 and 12 are fragmentary views in two positions showing the detail of the latch trip device associated with the bolt which locks the front ends of the two mould sections together;

Fig. 13 is a fragmentary plan view of the mould lock;

Fig. 14 is a plan view of the lock bolt which is used in the Fig. 13 construction;

Fig. 15 is a fragmentary sectional elevation showing the adjustment means for the setting of the locking cam which is associated with the lock bolt; and Fig. 16 is a fragmentary section showing the method of fitting the sole aligning buttons in the underface of the mould sides.

The hot table 20 is a plain surface on the top side of a hollow chamber 21, the plate 20 being rebated as shown at 22 on its underside to offer a larger heat absorbing surface to steam contained within the chamber 21. Steam is supplied to the chamber 21 through a supply service 25, the pressure being indicated in a gauge 26 and the service controlled by a valve 27. The chamber 21 is provided with a drain (not shown) for evacuating condensed water. Steam is supplied to the chamber 21 under a pressure head corresponding with the temperature required to be displayed on the surface of the hot table 20. The hot chamber 21 may be of any appropriate length to accommodate one or more moulds. In practice, the same chamber and table might accommodate several moulds. 28 is a stand-off frame on which the hot chamber is supported. 29 is a pedal lever carried on a pivot 30 and fitted with a locking pedal piece 31 co-acting with a sector plate 32 and a rocking shoe plate 33 which bears on the concaved side of the sector 32. The pedal lever 29 is connected by a pull rod 34 with a sheave spindle 37 through a compression spring 35 contained in a tubular casing 36. 38 is a sheave mounted for rotation on the spindle 37 and 39 is a bridle of flexible steel cable carried over the sheave 38 with its ends carried over two sheaves 40; these ends are respectively terminated in steel balls 41 which are slip fits into seats 42 on the bottom ends of the studs 43 which depend from the mould sections through a slot 44 in the front end of the hot table where it overhangs the chamber 21. The ends of the bridle 39 are accommodated in slots 45 which permit the insertion of the balls 41 in the seats 42 and are readily removable therefrom when it becomes necessary to replace the bridle 39 when it is worn or when it becomes necessary to remove the mould. When foot pressure is applied to the pedal lever 29 the locking piece 31 slides over the convex face of the sector 32, stressing the spring 35 and putting the bridle 39 under tension, thereby pulling on the studs 43 and bringing the front ends of the two mould sections together to the position shown in Fig. 4. Before releasing his foot pressure the operator tips the lock 31 so that it engages the sector 32 and thus holds the bridle 39 tensioned. To release the bridle and permit the mould sections to be swung open from the closed position shown in Fig. 4 to the open position shown in Fig. 8, the operator tips the lock 31 forwardly so as to release its nip on the convex side of the sector 32 and thus permits the lever 29 to rise.

46 and 47 are the two sections of the mould; they are massive blocks of aluminium or other metal, aluminium being preferred on account of its lightness and great heat conductivity, and 48 is a bow spring attached as shown at 49—49 to the front ends of the mould sections 46—47, the spring 48 being tensioned so that it operates to swing the mould sections apart to the position shown in Fig. 8. The bridle 39 thus operates reversely to the opening spring 48. When the bridle 39 is tensioned, the spring 48 is flexed, and the two mould sections are brought together face to face as seen in Fig. 4. Conversely, when the tension on the bridle 39 is eased off the spring 48 operates to swing the mould sections open to the positions shown in Fig. 8. The mould is hollowed internally to the shape of the boot or shoe upper, and it is necessary to provide a separate mould for each size and for each shape of shoe or boot which is to be produced. The cross section of the mould cavity is seen in Fig. 5, its plan view in Figs. 4 and 8, and its longitudinal section in Fig. 6. Around the lower edge of each section of the mould, buttons 50 (Fig. 16) are fitted; these buttons are screwed into the mould metal and are then checked out where they oversail the mould edges to offer resting places for the rebated edge 51 of the sole plate 52; this provision is necessary to prevent the mould rising from the hot plate when internal pressure is applied by means of the inflation to distend the boot during the cooking operation. The back ends of the mould sections (see Fig. 10) are hinge mounted on a post 53 which is detachably fitted as by means of a nut 54 in the hot table 20. 55 is an abutment adjusting nut on the end of the post 53. 56 is a cam-faced washer, fixed, as by a key 57 on the post 53, and 58 is a rotary cam complementary to the washer 56 and located between the cam 56 and the top face of the mould; it is fixed to the top member of the mould hinge by dowels 59. When the mould sections are swung apart as in Fig. 8, the downward pressure is released owing to the relative movement of the cam faces the one on the other, and when the mould sections are brought together to the position shown in Fig. 4 the cams operate to press down on the hinge and so lock the back end of mould sections tightly down on the hot table 20, a neat adjustment being obtained by means of the abutment adjusting nut 55; the spring 48 extends around the back end of the hinge post 53 as seen in Fig. 4.

The central forward and rear parts of the underface of the moulds at the meeting line are slotted to provide clearance for the peel members 60 and 61; these members are screwed up into the sole plate 62 as seen in Fig. 6. The rearward one 60 is slotted as shown at 63. The forward end of the member 61 is fitted with a hand piece 64; this hand piece is always located outside the mould and offers a convenient grip to the operator for sliding the peel carrying the sole plate 62 into and out of the mould. In the drawn out position as shown in Fig. 8 the end of the slot 63 acts as a check to prevent the too far drawing out of the peel. The sole plate 62 is shaped according to the section and patterning of the shoe sole required and it is a neat fit for the mould sections 46 and 47 and rests on the rebated ledges 51 as indicated in Figs. 9 and 16. According to the section of the sole plate 62 the shaping of the boot or shoe sole is determined, including the patterning on the under surfaces of it and the shape and section of the heel.

When the mould sections are closed together they are locked up by means of the swing bolt 66. A T head piece 67 on this bolt is rotatably anchored in the mould section 46 which is slotted out as shown at 68 to provide working clearance for the bolt. A tappet 69 on the tail of the bolt acts against a plunger 70 which is slidable through a hole in the mould so that its point bears against the other mould section 47. The tail of the bolt 66 is fitted with a double cam disc 71 which is rotatable about it (see Figs. 14 and 15). The outer side of the cam disc bears against an abutment nut 72 screwed onto the end of the bolt 66 and fixed by means of a screw 73. The cam faces on the member 71 co-act with corresponding faces 75 on the outer side of the mould section 47. 76 is a spring in tension engaging a tumbler 77 which is mounted on a pin centre 78 in the extension piece 79 on the bolt head, which extension piece carries the tappet 69 beforementioned. When the pedal 31 is depressed so as to pull on the bridles 39, the mould sections are swung inward from the open position Fig. 8 to the closed position Fig. 4. The bolt 66 is then swung into the slot 80 across the top of the mould section 47 by the action of the plunger 70, and the hand lever pin 81 which projects radially from the cam disc 71 may be then pushed over by the operator, with the result that the cam faces 71 are caused to run over the cam faces 75 and jamb up and lock the two mould sections 46 and 47 tightly together. After the cooking has been completed a quick forward movement on the lever 81 releases the engagement of the cam faces 71—75 and the spring 76 then operates to swing up the bolt 66 and release the mould sections the one from the other. This up-swinging movement of the bolt brings the tappet piece 69 against the head of the plunger 70, forcing the plunger outward, and so effecting separation of the mould sections 46—47, the full outward movement limited by the running of the studs 43 in the limit slot 65 being effected by means of the spring 48. The opening movement of the mould is thus almost automatic, the only action required of the operator being the knocking forward of the lever 81 to release the bolt. When the bolt is swung up a little way, the tumbler piece 77 swings outward from the position shown in Fig. 11 to that shown in Fig. 12 giving a leverage to the spring enabling it to operate the tappet 69 to best advantage. In the closing movement of the bolt, the tumbler piece 77 swings back from the position shown in Fig. 12 to that shown in Fig. 11, when it falls inside the alignment of the spring 76.

In operating the machine, the boot or shoe is built up in the manner previously described, that is to say the vamp or upper of duck or other fabric is cut and sewn in the usual manner and its skirt portion closed over a last upon an insole of rubber impregnated fabric and the infolded skirt tucked in and crimped down so as to set flat, and served with rubber dough. A rubber sole piece roughly shaped for containing the requisite volume of rubber to form the sole and heel is then placed on the prepared boot or shoe body and is temporarily held thereon by the adhesiveness of the rubber dough. A thin strip of rubber dough may be laid around the welt to cover it to form a foxing. After withdrawal of the last, the shoe or boot thus prepared is placed on the sole plate 62 (see Fig. 8) and the peel (Fig. 7) consisting of the parts 61 and 63 and the sole plate 62, is then pushed into the mould. The pedal 31 is then depressed, with the result that the bridles 39 operate to close in the two mould sections to the position shown in Fig. 4. The plunger pin 70 then swings down the bolt 66 and the operator knocks back the lever 81 thus locking the bolt and securing the two mould sections 46—47 tightly together. Meantime, an expansible inflation consisting of a rubber bag appropriately shaped and reinforced has been set within the boot or shoe and the table 20 has been heated up by steam supplied to the chamber 21. Air pressure being now admitted to the inflation the boot or shoe is pressed tightly up to the mould and the sole portion of it pressed tightly down on the sole plate 62 and the pressure is maintained for the necessary period to permit the curing of the rubber. The pressure applied is sufficient to shape the sole and heel piece perfectly and to compress and shape the welt so that when the cooking is completed the product is quite finished, a negligible "rag" only being left at the mould joints. Before the mould is opened air pressure is released from the inflation and the inflation drawn. When that is done the pedal 31 is released and allowed to rise, and the bolt 66 released by knocking the lever handle 81 forwardly so as to clear the cams 71—75, whereupon the bolt swings upward, forces out the starting plunger 70 which "breaks" the mould and thereafter the spring 48 opens the mould. When the mould has been opened the peel is drawn out to the position shown in Fig. 8, and the completed boot or shoe may be lifted off the plate with a peeling motion and set aside to cool off and season.

In operation, this machine can be worked very rapidly. It calls for minimum effort on the part of the workmen and offers maximum facility for inserting the prepared boot or shoe into the mould for cooking and for removing it therefrom; and the mould sections are held down firmly to the hot table so as to permit transmission of heat from the hot table to the lower part of the mould to effect the cooking of the rubber in the sole and heel piece and in foxing, and to ensure the attachment of the body to the sole.

What I claim as my invention and desire to secure by Letters Patent is:—

1. A machine for applying rubber soles to footwear comprising a hot table, a vertically divided mould with its respective sections hingedly mounted on a vertical post fixed in the table a bolt adapted to lock said mould sections together, a pedal operated bridle connected to the opening ends of the mould section and arranged for drawing them together when pressure is applied to the pedal, and spring means for separating the mould sections when the bolt and the pedal pressure are released.

2. A mould for the purposes set forth, comprising two sections with a vertical joint, said sections hingedly mounted at one end of them on a fixed post and closable bookwise a plate engaged by the mould sides when closed and released from them when they are opened apart and means for sliding said plate longitudinally of the mould whilst it is in opened position.

3. A mould for the purposes set forth, comprising two sections closable together bookwise on hinged joints carried on a fixed post, an adjustable ramp on said post and hinge, adapted for forcing said mould sections down on a hot table, in which the post is mounted, in the closing movement of the mould, ledge members projecting inwardly from the bottom edge of the mould and engageable with rebated portions of a sole plate which is embraced in the mould sections when closed, studs projecting downward from the free ends of the mould sections through an arcuate slot in the hot table, means operating through said studs for swinging the mould sections towards each other, a bolt adapted for locking the two mould sections together in closed position and means adapted for separating the mould sections when they are unrestrained.

4. A mould for the purposes set forth, comprising two hinge-mounted sections in contact with a hot table, said mould sections being arranged for opening bookwise, a sole plate embraceable between said mould sections in the closed position, and means for holding the mould tightly down on the hot table when it is closed.

5. In a mould of the kind herein described, means for binding the mould firmly down to the hot table in the closed position comprising coacting ramps one of which is adjustable, said ramps arranged to establish a thrust abutment on the hinge post as the hinge moves to the closed position.

6. A locking device for a centre opening mould of the type herein described, comprising a swing bolt pivoted in one of the mould sections and engageable through a cam head with the other of them, a retiring spring arranged to swing up said bolt to free it when the cam head is disengaged and a plunger adapted for forcing the mould sections apart, said plunger arranged in relation to a tail piece on the bolt so as to be moved by said tail piece to force the mould sections apart during the up-swinging movement of the bolt.

7. In a centre opening mould of the kind herein described, an independent soleplate forming the bottom part of said mould, and ledge members projecting inwardly from the bottom edge of the mould sides for supporting said soleplate about its edge.

8. In a centre opening mould of the kind herein described, an independent soleplate forming the bottom part of said mould, ledge members projecting inwardly from the bottom edge of the mould sides for supporting said soleplate about its edge, a peel bar slidably arranged for carrying said soleplate and for moving it lengthwise of the mould whilst the mould sections are spread apart.

9. Apparatus for the purposes herein described, comprising a centre opening mould mounted on a hot table above a steam chamber, a spring arranged for swinging the mould sections apart lengthwise, a fixed post forming a hinge pintle for the back ends of the mould sections, studs in the forward ends of the mould sections projecting through an arcuate slot in the hot table, a pedal with locking means on a frame below said hot table and a spring bridle connecting the pedal to the mould sections, said bridle arranged to draw the mould sections together when it is tensioned by the pedal, substantially as described.

In testimony whereof I affix my signature.

CHARLES HORACE RUSSELL COLLINS.